United States Patent [19]

Moon

[11] Patent Number: 5,170,299

[45] Date of Patent: Dec. 8, 1992

[54] EDGE SERVO FOR DISK DRIVE HEAD POSITIONER

[75] Inventor: Ronald R. Moon, Los Gatos, Calif.

[73] Assignee: Quantum Corporation, Milpitas, Calif.

[21] Appl. No.: 569,065

[22] Filed: Aug. 17, 1990

[51] Int. Cl.$^5$ .......................... G11B 5/596; G11B 5/55
[52] U.S. Cl. .................... 360/77.08; 360/51; 360/78.04; 360/78.14
[58] Field of Search ............... 360/77.02, 77.05–77.08, 360/78.04, 78.14, 135, 51, 49

[56] References Cited

U.S. PATENT DOCUMENTS

| | | | |
|---|---|---|---|
| 3,919,697 | 11/1975 | Walker | 340/173 R |
| 4,016,603 | 4/1977 | Ottesen | 360/135 |
| 4,032,984 | 6/1977 | Kaser et al. | 360/77 |
| 4,052,741 | 10/1977 | Baca et al. | 360/77 |
| 4,087,843 | 5/1978 | Louis et al. | 360/78 |
| 4,157,577 | 6/1979 | Porter, Jr. et al. | 360/77 |
| 4,400,747 | 8/1983 | Silverling | 360/77 |
| 4,424,543 | 1/1984 | Lewis et al. | 360/135 |
| 4,454,549 | 6/1984 | Pennington | 360/77 |
| 4,462,053 | 7/1984 | Lum et al. | 360/78 |
| 4,511,938 | 4/1985 | Betts | 360/77 |
| 4,578,723 | 3/1986 | Betts et al. | 360/77 |
| 4,590,526 | 5/1986 | Laatt et al. | 360/78 |
| 4,656,538 | 4/1987 | Mattson | 360/77 |
| 4,669,004 | 5/1987 | Moon et al. | 360/77 |
| 4,823,212 | 4/1989 | Knowles et al. | 360/77.08 |
| 4,910,617 | 3/1990 | Brunnett et al. | 360/78.14 |
| 4,912,576 | 3/1990 | Janz | 360/77.07 |
| 4,918,677 | 4/1990 | Ashinuma et al. | 360/78.14 |
| 4,933,795 | 6/1990 | Nigam | 360/121 |
| 4,984,100 | 1/1991 | Takayama et al. | 360/78.14 |
| 5,050,016 | 9/1991 | Squires | 360/77.08 |

FOREIGN PATENT DOCUMENTS

| | | |
|---|---|---|
| 0062690 | 4/1988 | European Pat. Off. |
| 0269381 | 6/1988 | European Pat. Off. |
| 0339851 | 2/1989 | European Pat. Off. |
| 1-124169 | 5/1989 | Japan |

OTHER PUBLICATIONS

C. C. Liu, "Quad-Burst Servo Pattern" *IBM Tech Discl. Bull.* vol. 22, No. 12, May, 1980 pp. 5436–5438.
W. A. Herrington and F. E. Mueller, "Quad-Burst PES System for Disk File Servo" *IBM Tech. Discl. Bull.* vol. 21, No. 2, Jul. 1978, pp. 804–805.
D. H. Pennington and A. A. Recupero, "Digital Sector Servo System" *IBM Tech. Discl. Bull.* vol. 22, No. 6, Nov. 1979 pp. 2476–2481.
R. K. Oswald, "Track Following Servo System" *IBM Tech. Discl. Bull.* vol. 18, No. 10, Mar., 1976, pp. 3424–3425.

*Primary Examiner*—Long T. Nguyen
*Assistant Examiner*—Steven R. Garland
*Attorney, Agent, or Firm*—David B. Harrison

[57] ABSTRACT

A method for determining the position of a data transducer head within one data track of a rotating data storage disk within a disk drive includes the steps of:

providing at least one prerecorded servo sector within the data track, the servo sector including first occurring servo burst having one longitudinal burst edge located substantially congruent with a centerline of the one track, and having another longitudinal burst edge located substantially congruent with a centerline of a second track adjacent to the one track, and second servo burst having longitudinal burst edges substantially congruent with the track boundaries of the one track.

detecting the presence of the sector as it passes by the data transducer head, sampling with the data transducer head and holding peak amplitude of the first servo burst, sampling with the data transducer head and holding peak amplitude of the second servo burst, comparing held first burst amplitude with a predetermined value to determine if the data transducer head has passed over a linear edge portion thereof, and if so, determining from the held first burst amplitude the position; and if not, determining from the held second burst amplitude the position of the data transducer head relative to the one track.

27 Claims, 9 Drawing Sheets

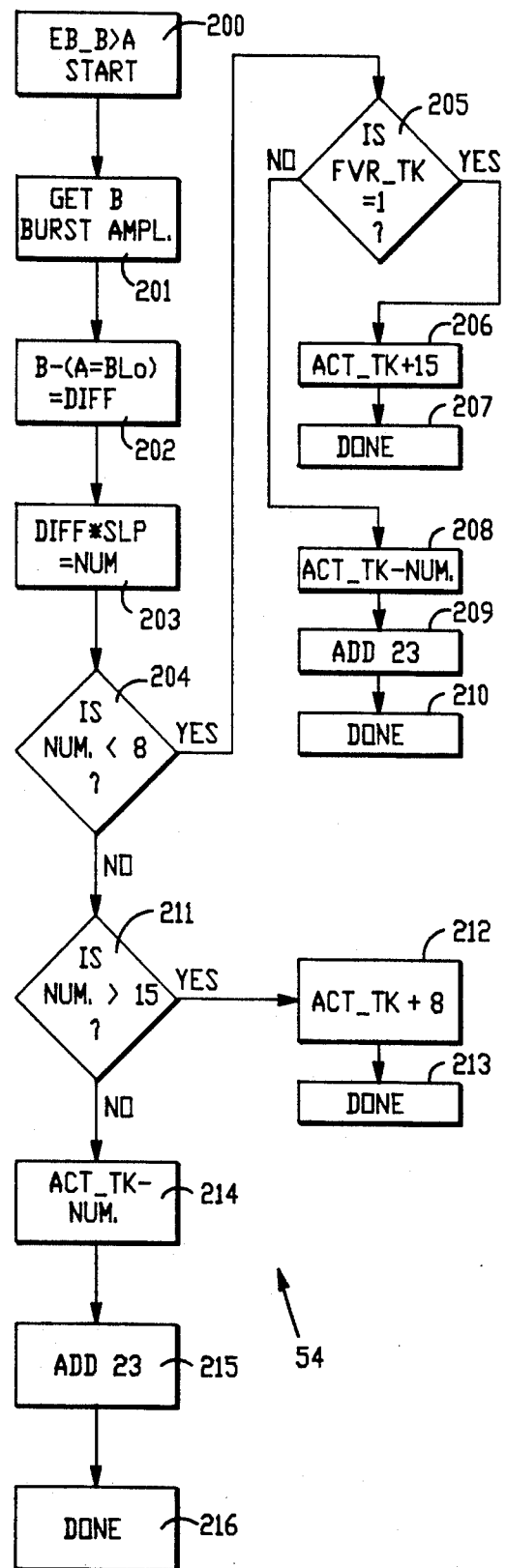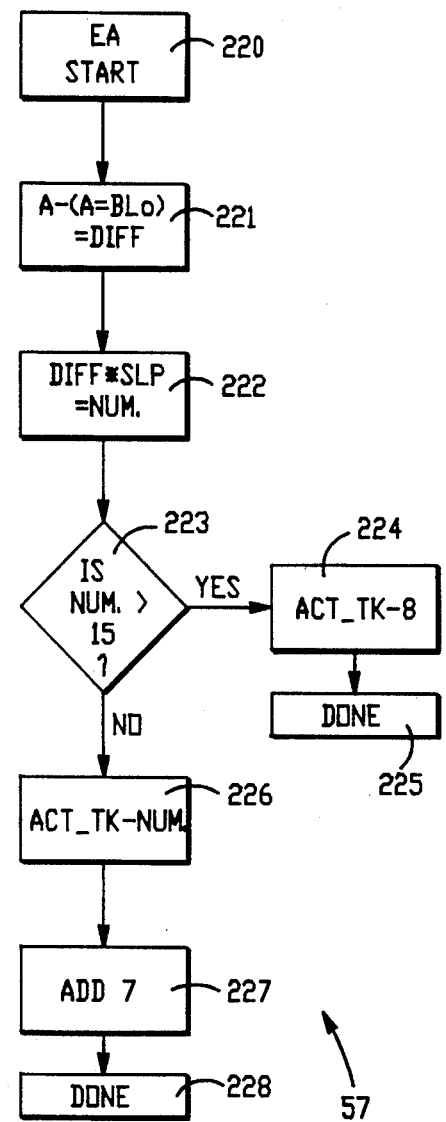
FIG.-4B
FIG.-4C

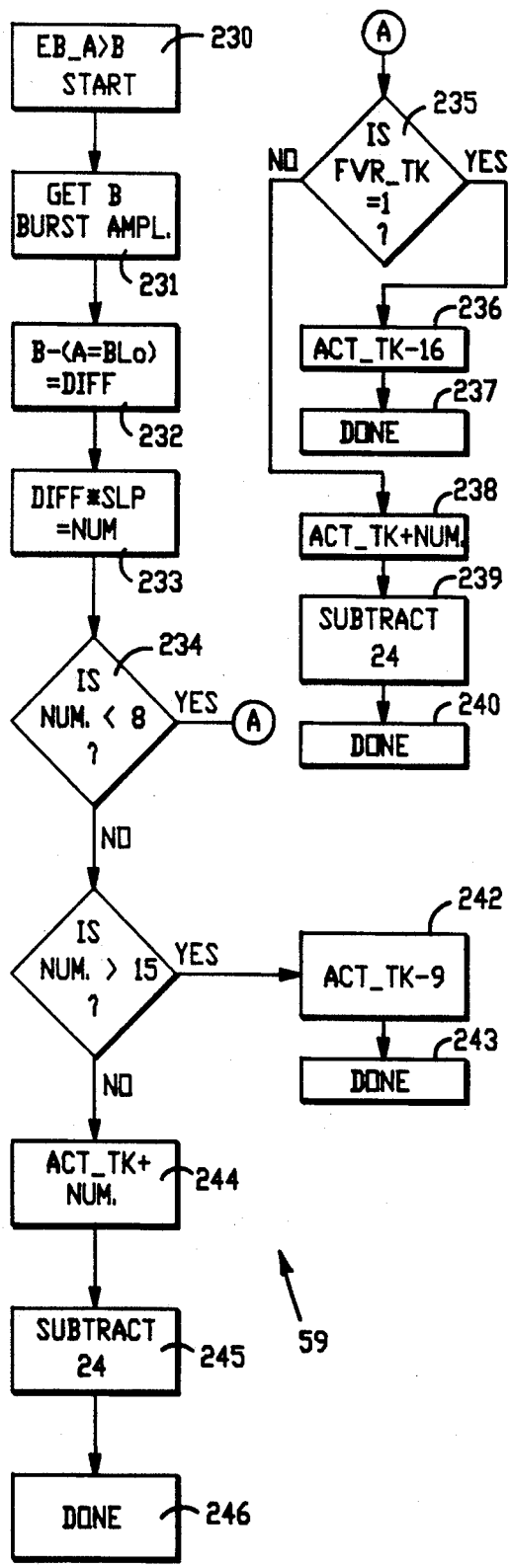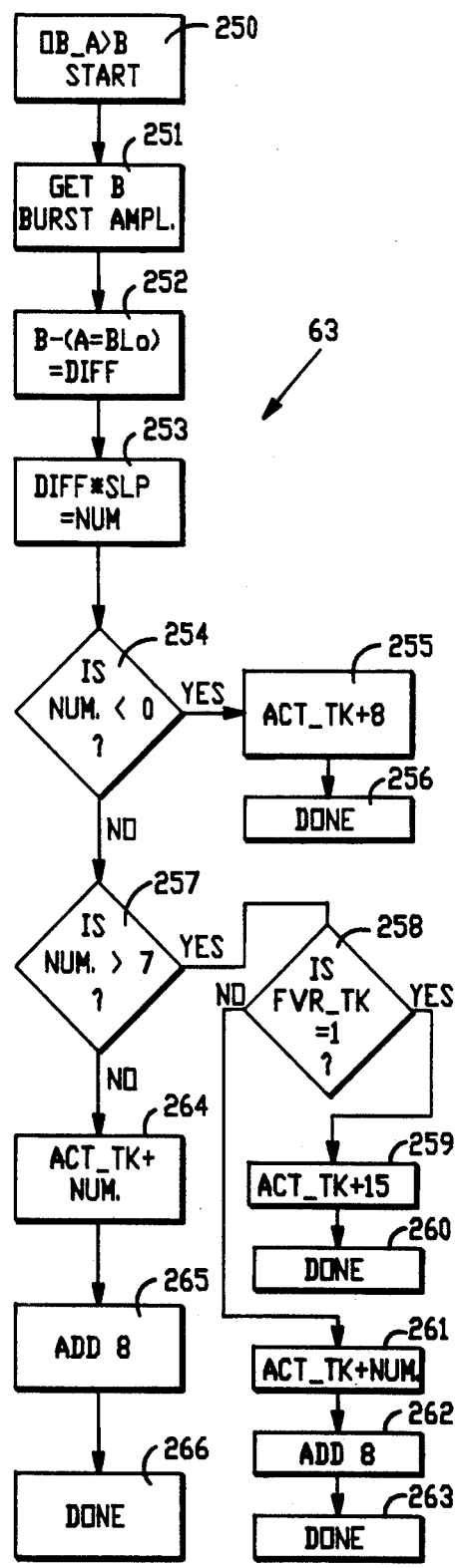
*FIG.—4D*  *FIG.—4E*

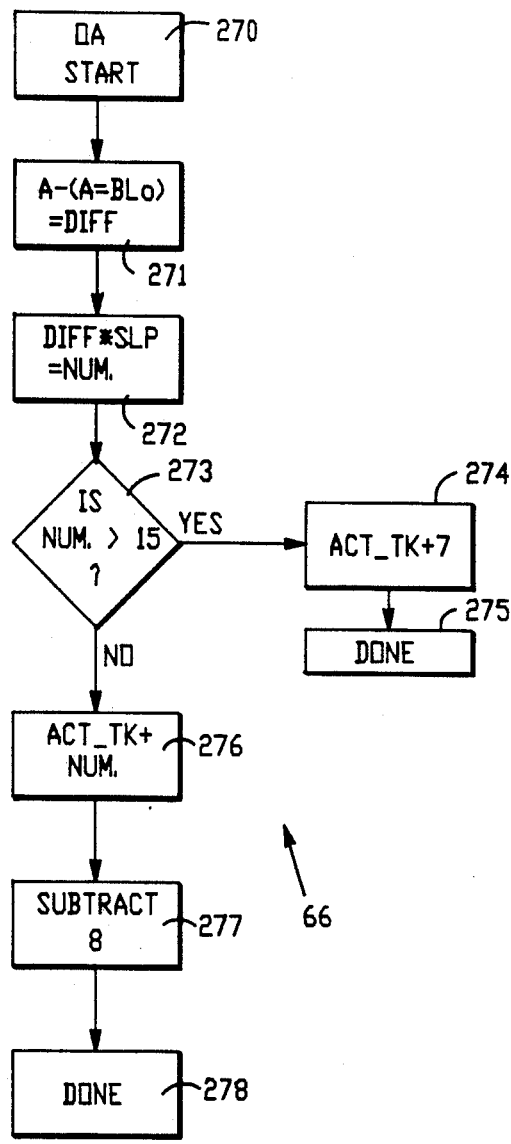
FIG.—4F
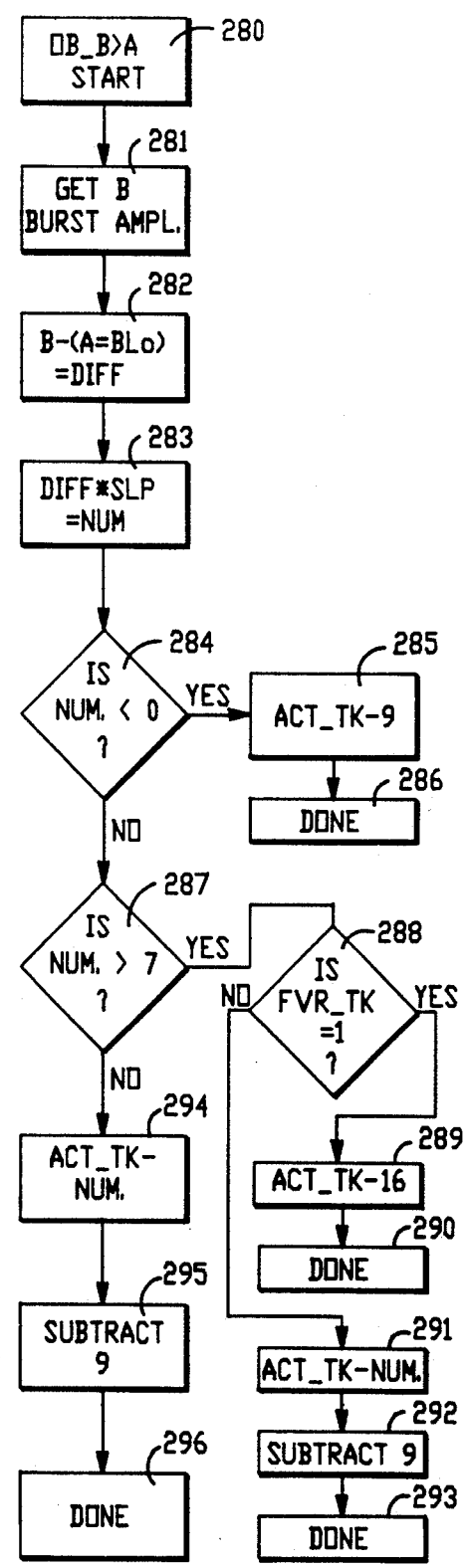
FIG.—4G

EDGE SERVO FOR DISK DRIVE HEAD POSITIONER

REFERENCE TO SOFTWARE LISTING p A microfiche containing a listing of microcode related to implementation of the present invention has been filed in connection with the application for this patent.

1. Field of the Invention

The present invention relates to head position servo control systems for disk drive data storage subsystems More particularly, the present invention relates to a head position measurement method and apparatus for a disk drive for determining incremental head position within a data track by reference to a selected servo burst edge obtained from an embedded servo sector, and a servo method and apparatus for making use of the edge servo position information.

2. Background of the Invention

Head position control systems for disk drives have followed many forms. One form employed for low track density, low cost disk drives has been a so-called "open loop servo" positioner employing a detent-providing actuator, such as a step motor. Concentric data track locations are defined by stable positional states or detents of the step motor. In order to access a particular track location, a controller issues step pulses to the step motor (usually through current driver circuitry) and the step motor rotates one step of rotation in a controlled direction for each pulse received This step rotation is then applied to rotate a rotary head positioner or is converted into rectilinear motion to move a linear head positioner. Open loop servo positioners have most frequently been employed in floppy disk drives, and have also been employed in some low cost, low capacity fixed disk drives, such as the Shugart Associates' SA1000 eight inch disk drive, and the Seagate Technology ST-506 and ST-412 five and one quarter inch disk drives The drawback of the open loop servo head positioner servo is that without any head position feedback information, the tracks must be spaced sufficiently apart in order to accommodate expansion and contraction tolerances occurring within the disk drive.

A second approach has been to dedicate an entire data storage surface of a disk drive to head position servo information. With this approach, a pattern of servo tracks is written very precisely with a servo writer apparatus. The disk drive is then outfitted with a servo head and a servo information read-only channel which operates within a head position servo loop. During head positioning operations, both during seeking mode and during track following mode, the servo pattern is constantly monitored and provides position feedback information to the head positioner servo loop. Such loop is consequently referred to as a closed-loop positioner, and the loop is closed about the servo surface and servo read channel. One drawback of the servo surface approach is that an entire storage surface must be devoted to servo information, together with a dedicated servo transducer head and servo read channel. Thus, this particular architecture is most applicable to disk drives employing four or more stacked data storage disks, so that the servo surface is not more than one-eighth of the total storage capacity of the disk drive. Another drawback of the servo surface approach is that over thermal cycles or after mechanical shocks, a positional discrepancy may develop between data recorded on a track of a disk other than the disk containing the servo pattern and the corresponding servo track nominally provided for registering the commonly mounted and moved transducer head stack.

A head position system which may be realized at lower cost than the dedicated surface closed loop servo but which does not employ the cost overhead of the servo surface and dedicated transducer/read channel, is realized with a head positioner transducer, such as a polyphase optical encoder, having a scale tightly coupled to the head arm assembly. The heads are then positioned on the basis of position information fed back to the servo control loop from the optical transducer. Unfortunately, system tolerances and shifts, typically due to thermal changes, inertia, reticle to scale gap shifts, etc., cause the optical encoder to lose calibration with actual head position.

One way of correcting for tolerances of the disk drive arising e.g. from thermal shifts, or otherwise, is to embed prerecorded servo information on one or more of the data storage surfaces, and to retrieve this embedded servo information periodically and use it as a position correction vernier in order to correct the position of the head transducer relative to data track location This correction information may be embedded as a single servo sector located at an index marker, as was done in the commonly assigned U.S Pat. No. 4,396,959, now U.S. Reissue Patent No. Re. 32,075 in the case of the polyphase optical encoder positioner servo loop. The disclosure of the referenced Re.32,075 patent is hereby incorporated by reference. Or, the information may be embedded as one or more servo sectors and used in combination with a servo surface as was done by IBM in its 62PC eight inch disk file also known in the industry as the "Piccolo" disk drive, see Robert D. Commander et al., "Servo Design for an Eight-Inch Disk File" *IBM Disk Storage Technology February* 1980, pp 90-98; also see IBM U.S. Pat. No. 4,072,990 relating to this approach.

Still another method for providing head position feedback information to a head positioner servo loop is to embed servo information in a sufficient number of servo sectors interleaved within the data tracks such that the servo information may be periodically sampled and held, and head position thereupon derived from the samples. In an embedded sector servo system, head position resolution will depend e.g. upon the number of samples provided per rotation and the efficiency with which the servo loop can process each sample into a correction value for correcting head position A disk drive employing an embedded servo head positioner servo loop is described in the present inventor's commonly assigned U.S. Pat. No. 4,669,004, the disclosure of which is hereby incorporated by reference.

To be effective, an embedded servo pattern should include information identifying the track as unique from its neighboring tracks, and the pattern should provide a centerline reference as well. The track identification number is useful during track seeking operations to indicate the radial position of the data transducer head relative to the storage surface, and the centerline reference is useful to center the data transducer head over the track centerline during track following operations The servo information may include a spatial quadrature relationship which may be used to indicate the direction of movement of the head transducer relative to the tracks during seeking In the referenced '004 patent, four non-phase coherent bursts were provided for each servo sector embedded within each data track. These bursts provided spatial quadrature as well as track position information, which was resolved digitally to a one-third track pitch level.

It is known that a head transducer may function as a very accurate radial position measurement device relative to recorded patterns passing by the head transducer. By this is meant that if the head reads a prerecorded burst pattern, the amplitude of the recovered signal will be proportional to the degree of coincidence radially between the head transducer and the burst pattern. If a head is in alignment with the burst, a maximum amplitude is recovered. If only a fraction of the burst is encountered by the head, the amplitude of the recovered signal will be a fractional amount of full amplitude which is proportional to the radial displacement of the head. If the head misses the burst completely, then no burst amplitude is recovered.

With modern servo writing techniques, embedded sector servo patterns are typically written in multiple, phase coherent passes of the data transducer head so as to record servo data field and centering burst patterns which are wider than the electrical width or head gap of the data transducer head. This additional servo sector width advantageously provides for a suitable guard band between each data track, the width thereof being fixed by the head gap width. However, in this situation, a head may be aligned completely with a servo burst, but incapable of resolving relative position within a dimension by which the radial width of the burst exceeds the head width. This dimension is in effect a servo dead zone. As the head moves throughout the extent of the dead zone, the amplitude of the signal recovered from the burst will remain substantially invariant. Thus, the servo loop experiences a dead band throughout this range The prior art has attempted to accommodate the dead band by providing two or four time staggered, radially offset bursts having burst edges of a pair of bursts aligned with track centerline in each servo sector. The relative amplitudes of two selected bursts having opposite edges in alignment with the centerline of the track being followed are then compared to develop a centerline offset error signal However, this prior approach has not provided accurate position information when the head is not in precise alignment between the two radially aligned edges of the time staggered bursts. This situation becomes important during track seeking operations and most particularly during a transitional operational phase between track seeking mode and track following mode, a phase known as track settling.

One known drawback of the prior art is that the track settling phase has required a significant time period, thereby effectively extending track access times associated with track seeking.

Another hitherto unsolved need has remained for a more precise servo system which provides more precise position information within a full positional linear range between the boundaries of each track, thereby enabling faster and more precise track settling operations to be carried out.

SUMMARY OF THE INVENTION WITH OBJECTS

A general object of the present invention is to provide a head position servo control system for a high capacity fixed disk data storage subsystem employing a predetermined plurality of embedded servo sectors wherein the sector servo pattern provides a track number and further provides a plurality of servo burst edges within each track enabling measurement of the precise location of the head relative to the track and of vernier head position control in a manner which overcomes the limitations and drawbacks of the prior art.

Another object of the present invention is to provide a servo pattern for a disk drive in which only two servo bursts are employed to provide edges during track seeking and settling operations, and wherein only two servo bursts are employed to provide absolute track centerline position information during track following operations, and wherein at least one of the bursts is commonly used during both track seeking and settling mode, and track following mode, thereby limiting the total number of servo bursts needed to not more than three per sector interval.

A further object of the present invention is to provide a burst pattern for a data track servo sector which provides a plurality of burst edges which may be selectively quantized digitally and used to provide an absolute head position measurement vernier within the data track.

One more object of the present invention is to provide a burst pattern for a data track servo sector in which burst edges are selected by detection of low amplitude and high amplitude equivalence points between adjacent bursts.

Yet one more object of the present invention is to provide a disk drive with a plurality of data track zones wherein each zone has a number of data sectors and a bit transfer rate adapted to optimize bit density radially across the data surface and with a plurality of evenly spaced servo sectors throughout the radial extent of the data storage surface, and wherein the information in the servo sectors may be read by the same electronics for reading the data patterns.

Still one more object of the present invention is to provide a high capacity, high performance, low access time disk drive which uses an embedded sector servo pattern adapted to minimize processing time and hardware in order to acquire an absolute position value from a servo sector during track seeking and settling operations.

Yet a further object of the present invention is to provide an embedded sector servo pattern optimized to a sixteen bit digital processing system within a head positioning servo loop of a disk drive.

Yet one more object of the present invention is to provide an absolute position resolving servo loop which removes any track number ambiguity otherwise resulting from hysteresis (i.e. track number preference) characteristics of the data channel of the disk drive.

A still further object of the present invention is to provide a method for controlling head position within a disk drive from absolute head position information relative to adjacent data tracks provided by quantization of servo burst edge amplitudes read from burst edges within embedded servo sectors on a data surface.

In accordance with the principles of the present invention a data storage disk of a high performance, high capacity disk drive includes a prerecorded pattern of embedded servo sectors prerecorded on a data storage surface of a rotating storage disk. The servo sector pattern prerecorded for each track is radially wider than the radial head gap width of a data transducer head associated with the data storage surface leading to a position-resolution dead zone within each burst width.

The pattern includes for a second concentric data track lying between a first track and a third track of a multiplicity thereof: a) a servo sector address mark field including a magnetic flux transition pattern prerecorded therein for identifying the start of the servo sector pattern; b) a track number field including a magnetic flux transition pattern prerecorded therein for identifying the second data track from among the multiplicity thereof; c) a first occurring servo burst being prerecorded with a predetermined servo burst magnetic flux transition pattern and having one longitudinal burst edge located substantially congruent with a track centerline of the second track, and having another longitudinal burst edge located substantially congruent with a track centerline of the third track; and, d) second occurring servo bursts being prerecorded with the predetermined servo burst magnetic flux transition pattern for providing burst edges substantially congruent with track boundaries of the second track relative to the first track and the third track, the second servo bursts being recorded entirely within the boundaries of the first track and the third track.

In one aspect of the present invention, the servo sector pattern further comprises for a track following servo mode a third occurring servo burst being prerecorded with the predetermined servo burst magnetic flux transition pattern and located spatially as to be electrically 180 degrees out of phase with the first occurring servo burst such that the third occurring servo burst has one longitudinal burst edge located substantially congruent with the track centerline of the second track and another longitudinal burst edge located substantially congruent with a track centerline of the first track.

In another aspect of the present invention a method is provided for determining a digital radial head position value within a disk drive including a rotating storage disk defining a data storage surface, a data transducer head for reading and writing data from and to concentric data storage tracks on the storage surface, control electronics associated with the data transducer head and an actuator for moving the head and wherein the data tracks include embedded sector servo information. In this aspect of the invention, carried out during a seek and settle mode, the method comprises the steps of:

reading a track number from a track number field of a said embedded sector to determine radial head position in proximity to circumferential boundaries of a said data track identified by the track number, determining the amplitude of a first servo burst and selecting therefrom a circumferential edge from a plurality thereof, quantizing the amplitude read from the selected burst edge as a digital value, calculating a fine position vernier value relative to the said data track based upon the quantized digital value of selected burst edge amplitude, and adding the fine position vernier value to the track number of the said data track thereby to provide the digital absolute head position value for the selected sector.

As one facet of this aspect of the present invention, track crossing rate is measured, and a flag is set if the track crossings are occurring at a rate of e.g. five tracks or more per servo sample. When the flag is set and under certain between-track head position circumstances, only the track number is read from the track field and the burst amplitudes are ignored. When the flag is not set, the burst edge amplitudes are used to resolve any ambiguity otherwise resulting from hysteresis in the data channel of the disk drive.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawing:

FIGS. 4B through 4G comprise flowcharts of subroutines called from the FIG. 4A main routine.

DETAILED DESCRIPTION OF A PREFERRED EMBODIMENT

Figure 1:
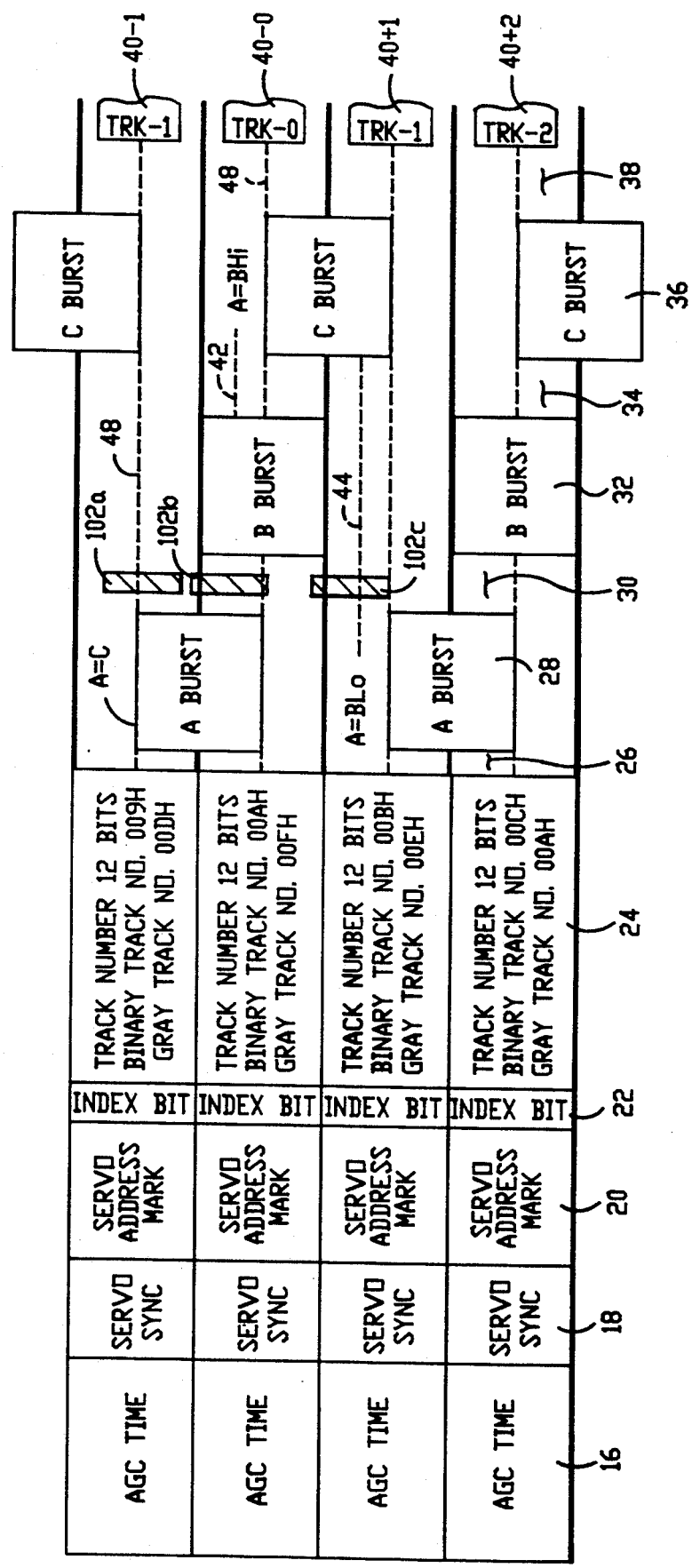
FIG. 1 is a diagram of a prerecorded embedded servo sector pattern for a disk drive in accordance with the principles of the present invention, the pattern being repeated on a data storage surface of a rotating disk in a disk drive and including A/B/C servo bursts wherein the A and B bursts form an edge servo for track seeking and settling and wherein the A and C bursts form a track following servo pattern.

With reference to FIG. 1 a prerecorded servo sector pattern is provided for controlling head positioning within a disk drive. The disk drive may be of the floppy, or removable media type, or, more preferably it may be a fixed disk drive 100 (see FIG. 5) wherein data storage disks 14 are fixed to a spindle hub within an enclosed head and disk assembly. The sector pattern depicted in FIG. 1 is embedded within concentric data storage tracks of a disk surface, meaning that the sector pattern periodically interrupts the data storage area of each data track in order to provide absolute positional information, via a data transducer head 102 associated with the particular data storage surface, to control circuitry of the disk drive 100 comprising a head position servo loop.

The servo sector pattern depicted in FIG. 1 passes by the data transducer head 102 and is read during a servo sector interval denoted by the reference numeral 10. Servo data is sampled and held for processing by the control circuitry. The servo sector is read during track seeking operations, i.e., when the data transducer head 102 is being moved from one radial track location to another radial track location; it is also read during track settling operations, i.e., when a destination track centerline is being approached by the data transducer head 102; and, it is read during track following operations, i.e., when the data transducer 102 is following the centerline of a data storage track and is in position for reading or writing user data to and from data storage portions of the track being followed.

Figure 5:
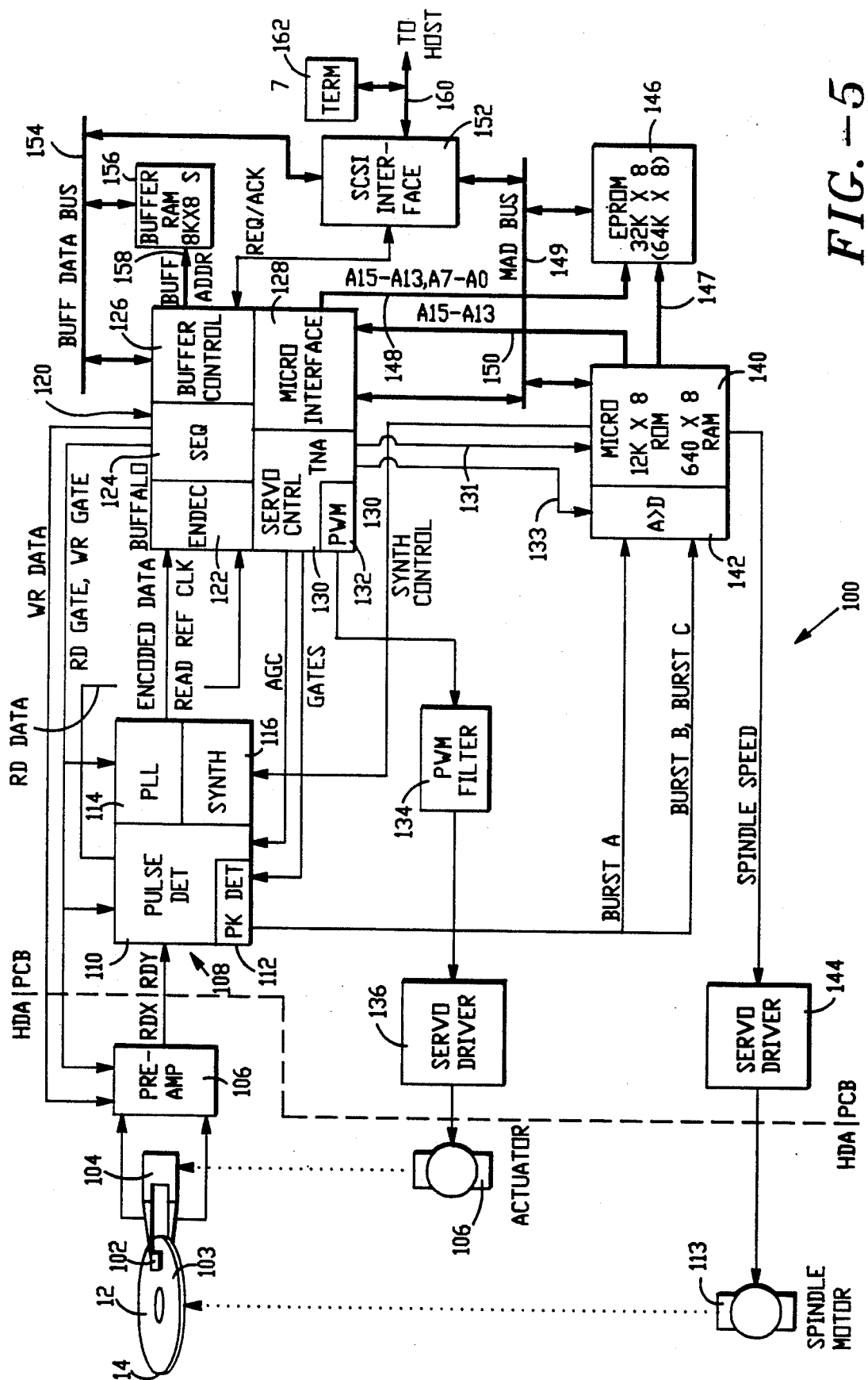
FIG. 5 is a block diagram of a disk drive incorporating a rotating storage disk having the FIG. 1 prerecorded embedded servo sector pattern.

The servo sector interval duration is marked in terms of "T" periods wherein T is a basic clock cycle period of 62.5 nanoseconds (repeating at 16 MHz) The servo sector interval 10 has a nominal duration of 386T (24.125 microseconds), and preferably there are 52 sector intervals 10 prerecorded in each concentric data track on each data surface 12 of one or more of the rotating data storage disks 14 of the disk drive 100. The servo sectors 10 are equally spaced apart and interrupt the multiple-zoned data tracks at fixed intervals as shown in FIG. 5 and discussed hereinafter.

Each servo sector interval 10 is prerecorded with the data transducer head 102 which is precisely positioned during servo writing with the aid of a servo writer, such as the one described in commonly assigned U.S. Pat. No. 4,920,442, for example. FIG. 1 illustrates a portion of the sector 10 for four adjacent concentric data tracks, e.g. tracks n−1, n, n+and n+2, etc., it being understood that a beginning track number n=0 lies at a radially outermost region of the data storage disk 14, and that the highest track number, e.g. n=2000, lies at a radially innermost region of the data storage disk 14. While the FIG. 1 servo sector graph is drawn in rectilinear format, it will be understood by those skilled in the art that actually each track and its embedded servo sectors follow the locus of a circle, as more accurately shown in FIG. 6.

Also, each servo sector interval 10 has a width greater than the head width of the data transducer 102 thereby to establish guard bands. In order that the servo information be written in the radially wider servo sector interval 10, multiple passes are made over the interval by the head 102 while phase coherent servo writing currents are selectively transduced by the head 102 into the magnetic media coating of the disk surface. As already noted, the greater servo burst width results in a saturated-amplitude-level dead zone DZ (see FIG. 2B) within each burst through which the head 102 is unable to determine position based upon that burst.

As prerecorded by the servowriter apparatus, each servo sector interval 10 preferably includes an AGC field 16, a servo sync field 18, a servo address mark field 20, an index bit field 22, a track number field 24, a first DC erase gap 26, a first servo burst field 28 labelled "A" burst, a second DC erase gap 30, a second burst field 32 labelled "B" burst, a third DC erase gap 34, a third burst field 36 labelled "C" burst, and a fourth DC erase gap 38. The track number field 24 and the A and B burst fields 28 and 32 are used to provide absolute head position during track seeking and settling operational mode, and the A and C burst fields 28 and 36 are used to provide absolute head position information during track following operational mode. In this manner, to be explained in greater detail hereinafter, only two time staggered servo burst fields are required for absolute head position information during each operational phase, whether it be track seeking, track settling or track following.

The AGC field 16 is prerecorded with a 3T repeating pattern (100s), which are repeated 24 times. The 3T pattern is further to be understood as a positive (or negative) going flux reversal pulse, followed by two non-active time periods (T periods of no flux transitions). The next 3T pattern is a negative (or positive) going flux reversal also followed by two non-active T periods during which there are no flux transitions or reversals associated with the disk data surface 12. The AGC field 16 is therefore used to adjust the gain of drive read channel electronics 106 and 110 to a predetermined reference value prior to reading the burst amplitude of the servo bursts 28, 32 and 36 as will be hereinafter explained. In this manner there is no need to calculate an AGC value as has been previously required for each track location in accordance with the burst amplitude relations: $(A-C)/(A+C)$, for example.

It should be noted that the 3T pattern in the AGC field 16 is phase coherent from track to track throughout the radial extent of each sector 10 and is used to calibrate and normalize the gain characteristics of the read channel electronics associated with the data transducer head 102, so that the AGC field 16 creates an electrical signal of known amplitude. During seeking, the read channel data amplitudes tend to vary. Therefore, having a known AGC value for a servo sector interval 10 is especially useful during track seeking and settling mode.

The servo sync field 18 is a 3T pattern which is repeated 6 times, for a duration of 1.13 microseconds. The servo sync field 18 is also phase coherent from track to track throughout the radial extent of the sector 10. The servo sync field 18 enables a master state machine located within the servo control circuit 130 to detect that a servo sector is presently being read and to set up timing windows for subsequent fields within the servo sector, including particularly the servo address mark field. This approach avoids the need to use the phase locked loop 114 to set up timing for marking boundaries of the servo sector fields.

The servo address mark field 20 sets forth a servo address value which is intentionally designed to violate a run length limited data encoding pattern otherwise present in all of the data zones for the data values which are recorded and read back by the disk drive 100. The disk drive 100 preferably employs a 1,7 run length limited data encoding scheme, which means that the minimum number of zeros between ones is one, and that the maximum number of zeros between ones is seven. The servo address mark field 20 is prerecorded e.g. with a twice repeating pattern of 14T, i.e. 10000000000000 (a flux transition followed by 13 non-active T periods). After the 2X14T pattern, a nine-bit servo data zero pattern is read. This servo data zero pattern, i.e. 10 000 010 0, is decoded by the servo loop as a binary zero. The servo address mark indicates to the data separator that the information immediately following in time comprises servo position information (as opposed to user data or other information).

Disk position (rotation) information is provided from the index field 22. If the sector 10 is the first servo sector of the 52 servo sectors within the concentric data track pattern, a prerecorded nine bit servo data one pattern, i.e. 10 010 000 0, is read out to provide a once per revolution index marker. If the sector 10 is not the first sector, then the index field 22 is prerecorded with a nine bit zero value.

The track number field 24 is prerecorded with sixteen servo data bits, each comprising 9T periods, in accordance with a Gray code format. For example, for a binary track number of 00A(hex), the Gray code format will be 00F(hex). Thus, the pattern encoded in the track number field 24 for a Gray coded track address of 00F(hex) will be: 10 000 010 0 10 000 010 0 10 000 010 0 10 000 010 0 (first zero); 10 000 010 0 10 000 010 0 10 000 010 0 10 000 010 0 (second zero); 10 010 000 0 10 010 000 0 10 010 000 0 10 010 000 0 (F value). This pattern is consistent with the 1,7 run length limited data encoding pattern, and it is also consistent with a 3T pattern which limits the minimum time for flux transitions (ones between zeros) to occur not more frequently than once every third clock cycle. This limitation ensures that the servo track number will be reliably readable even though data may be recorded at a higher transfer rate (2T) in some data zones, which marks the bandwidth limit of the read channel of the disk drive 100.

The DC erase gaps 26, 30, 34 and 38 respectively separate the track number fields 24 from the time staggered, radially offset A, B and C bursts 28, 32 and 36, and from the beginning or resumption of the data track 40. The A, B and C bursts are each recorded with a 3T pattern repeated twelve times. Each A burst straddles alternate track boundaries between two adjacent tracks, e.g. the tracks n−2 and n−1, n and n+1, and n+2 and N+3. Thus, alternate circumferential edges of the A bursts are aligned with the track centerlines of every data track.

As shown in FIGS. 1 and 2, the B bursts are circumferentially offset (i.e., follow in time or "time staggered") with respect to the A bursts and are radially offset so that their relative amplitudes are in electrical quadrature with A burst amplitudes, as well. By "quadrature" is further meant that each B burst is offset by one quarter track pitch from each A burst. By way of further explanation, if there are 360 degrees between centerlines of adjacent tracks, the B burst is radially offset by 90 degrees from the A burst. Each B burst straddles an even track, e.g. tracks n−2, n, and n+2. so that the circumferential edges of each B burst are substantially aligned with the track boundaries of the track being staggered, and of the two adjacent odd tracks as well.

Figure 2A:
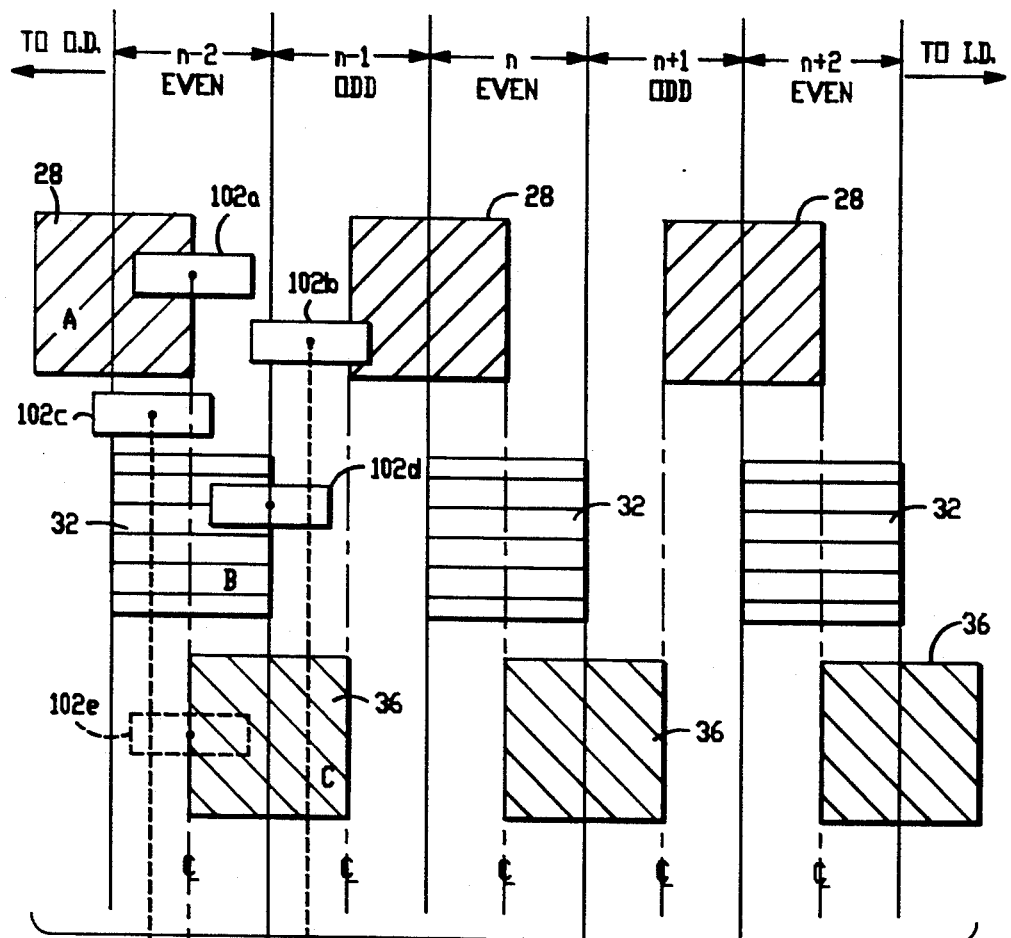
FIGS. 2A and 2B are diagrams illustrating edge servo arrangement in accordance with the present invention by graphing relative amplitudes of the A/B servo burst pattern in spatial quadrature as a function of radial position of a data transducer head on the disk surface.

With reference to FIG. 2A, it will be apparent that the radial width of the head gap of the head 102 is less than the nominal width of each data track. This arrangement conventionally provides a margin or guard band between each track to minimize crosstalk from track to track and consequent data errors. As already noted, this arrangement further results in a dead zone DZ within each burst in which the head is incapable of resolving its position.

Figure 2B:
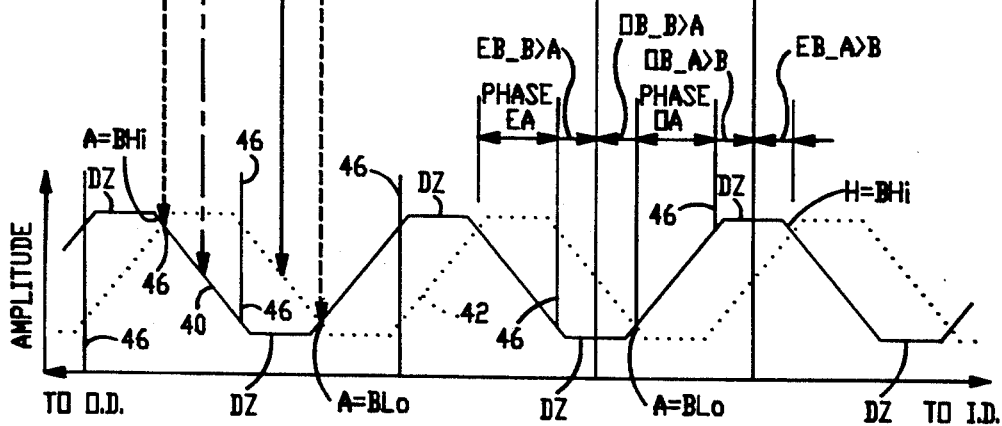

FIG. 2A depicts a portion of the disk 12 containing a servo sector interval 10. The vertical arrow illustrates relative rotational movement of the disk 12 relative to the head 102. FIG. 2B depicts electrical amplitude waveforms of signals read from the A and B bursts as a function of radial displacement of the head 102. The saturation level dead zones within each burst amplitude are labelled DZ in FIG. 2B.

As the data transducer head 102 moves across a circumferential edge of an A or a B burst, an amplitude value will be obtained which is proportional to radial displacement of the head 102 relative to the burst edge. The amplitude values define fairly linear diagonal waveforms as graphed in FIG. 2B, with the amplitude of the A burst graphed as a solid line 40, and with the amplitude of the B burst graphed as a dotted line 42. Each line is similar to the other and is offset by 90 degrees in phase (quadrature). The horizontal segments mark the dead zones DZ in which radial displacement of the head 102 will result in no change in burst amplitude level. The diagonal segments mark radial positions of the head 102 in which amplitude is proportional to radial displacement. The diagonal segments reverse in sense as the head traverses the disk surface 12 from an outside diameter (OD) to an inside diameter (ID).

By inspection of FIG. 2B it is apparent that there are no radial positions which are not defined by a circumferential burst edge providing linear head position feedback, and that the transitions between edges lie between track boundaries and track centerlines (denoted by superimposed "C" and "L" in FIG. 2A). Thus, a servo burst edge may be selected and quantized in order to provide an incremental, linear position value which can be added to the track number read from the track number field 24 thereby to provide an absolute head position at a particular sector 10 which is particularly valuable during the track seeking and settling mode of the disk drive head positioning operations.

For example, when the data transducer head 102 is following the centerline of track n−2, (denoted by the reference numeral 102a in FIG. 2) half of the head width passes over the A burst 28 and half passes over a DC erased area not containing any flux transitions. This condition results in a half amplitude value along an A burst diagonal edge 40 that slopes upwardly with radial position of the head 102.

With the head in the radial position denoted by the reference numeral 102b in FIG. 2A, a minimum amplitude equivalence point A=BLo is sensed. This position is one quarter track pitch radially outwardly of centerline of the track n−1 (and is also three quarters of a track pitch radially inwardly of centerline of the track n−2). In this position, the head 102 intercepts only a small segment of the A burst 28 and a like small segment of the B burst 32.

With the head in the radial position denoted by the reference numeral 102c in FIG. 2A, a maximum amplitude equivalence point A=BHi is sensed. This position is one quarter track pitch radially outwardly of centerline of the track n−2. In this position, the head 102 intercepts equal major segments of the A burst 28 and the B burst 32. With the head in the radial position denoted by the reference numeral 102d (straddling the track boundary between tracks n−2 and n−1 for example) a point is located in the center of a slope segment of the B burst graph 42.

Each diagonal slope or edge is preferably quantized at a resolution of 1/32nd ($2^5$) increments. For any track n, there are portions of three diagonal edges of A and B bursts which are available to be selected for amplitude quantization. It will be apparent by inspection of FIG. 2B that a position offset from centerline of the closest track read during the track number field time can be calculated and added to the track number so read. The combination of the A and B servo bursts arranged as shown in FIGS. 1 and 2A, for example, therefore provides at least one servo edge capable of being followed by the data transducer 102. In operation, explained hereinafter in conjunction with the FIG. 4 flowcharts, one of the three available edges within each data track is selected, and the proportional amplitude of the burst associated with the edge quantified in order to provide an absolute position value for vernier adjustment of head position to nominal track centerline.

The switchpoints 46 mark locations at which switchover occurs from one linear slope portion of one of the bursts, such as the A burst 28, is made to the linear slope portion of the adjacent other burst, such as the B burst 32. Advantageously, each switchpoint occurs at a radial position which is offset each side of track centerline by one quarter of a track. This arrangement means that any transients or other disruptions occurring from switching between servo burst circumferential edges occurs away from track centerline, when a stable, undisturbed servo reference is needed during track following.

While the C burst 36 is depicted in FIGS. 1 and 2, it should be understood that the C burst 36 is not used in the edge servo position vernier mode, and is preferably used during track following only because it is very accurate and robust. The A/C burst pattern is conventional and enables each data track centerline to be marked by equal A and C burst amplitudes. While the C burst 36 is presently preferably included within each of the servo sector patterns 10 in each track for track following operations, the C burst 36 may be provided in alternate ways; or it may be omitted, with track centerline following mode based upon the H burst edge alone.

The C burst may be included with the A burst in one or more selected calibration tracks, such as an outer calibration track, a middle calibration track, and/or an inner calibration track, for example. In this arrangement, the A/C burst common edge at a centerline would be followed to calibrate the circuitry used during following of a particular edge during track following operations.

Conventionally, the C burst is positioned to be radially offset by 180 degrees from each A burst. Thus, a head following a data track centerline will obtain a half amplitude value from the A burst (radial and circumferential position 102a in FIG. 2A), and it will then obtain a half amplitude value from the C burst (radial and circumferential position 102e in FIG. 2A), as was described in the referenced U.S. Reissue Pat. No. Re.32,075 noted above.

Figure 3:
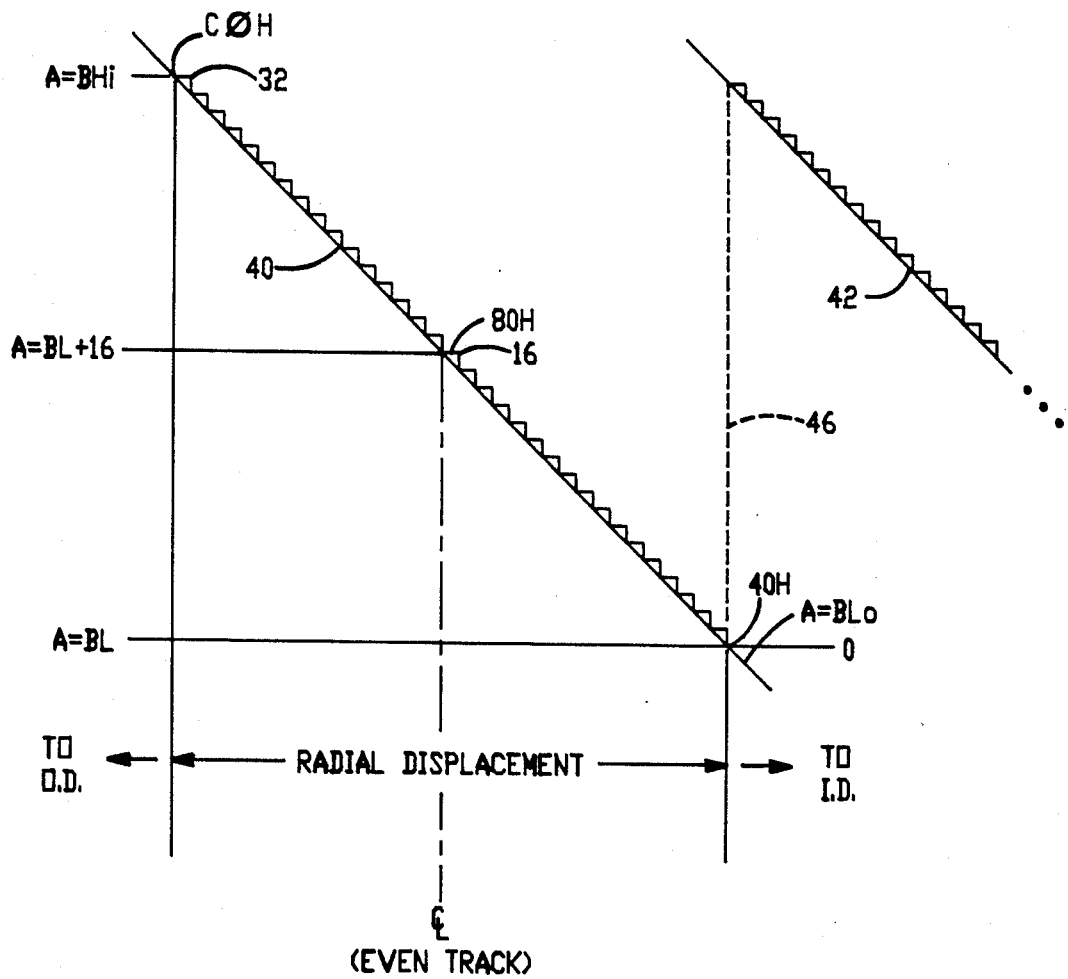
FIG. 3 is a graph of one example of quantization values for a servo burst edge in relation to radial position of the data transducer head.

With reference to FIG. 3, each diagonal slope of the waveforms 40 and 42 between the A=BHi point and the A=BLo point may be quantified into one of e.g. 32 amplitude values. These values are digitized and may then be added as a five bit, low bit position vernier to the eleven bit, upper bit position digital track number read from the track number field 24. In one example, the high equivalence point A=BHi quantizes at C0 (hex), the low equivalence point A=BLo quantizes at 40 (hex), and a centerline midpoint on the edge quantizes at 80 (hex). The slope of the edge 40 is determined during a recalibration routine and has the following formula:

$$SLP = [256*16]/[(A = BHi) - (A = BLo)]$$
$$= 256*delta\ y/delta\ x,$$

where delta x is the change in amplitude between A=BHi point and A=BLo point as a function of radial displacement y of the head along a particular edge.

A representative slope is calculated during a recalibration operation which is performed when the drive is powered up and also periodically as needed during pauses in other data transfer operations. Also, the A=BHi and A=BLo values calculated for a representative track.

Even if the data transducer head 102 passes directly over a track boundary separating two adjacent tracks, such as the head position graphed at 102D in FIG. 2A wherein the head is straddling the boundary between the tracks n−2 and n−1, only one track number will be read from the data track field 24. This selectivity is due to the nature of the pulse detector 110 which decodes only alternating flux transitions. The second flux transition in the same direction occurring without a reverse flux transition is ignored by the pulse detector 110.

Thus, even though both track numbers are read with equal amplitudes, only the track number having a first occurring flux transition in a bit position will be recognized. Consequently, it will be apparent to those skilled in the art that if a calibration operation is periodically carried out wherein the high amplitude equivalence points 42 and the low amplitude equivalence points 44 are sensed, and the position of the head transducer 102 set to one quarter track pitch outwardly from even track centerline and odd track centerline respectively, the A burst edge 28 will thereupon become calibrated such that a midpoint quantization value 16 will in fact correspond to track centerline.

Returning for a moment to FIG. 2B, it will be noted that four servo burst edge phases have been assigned within a complete cycle of the A and B burst amplitudes. In phase EA the A burst edge 40 is used within even tracks, and in phase OA the A burst edge 40 is used within odd tracks. In phase EB and phase OB, the B burst edge 42 is used. The other edge segments are more complicated and are divided into halves, selected by available B burst edge and whether an odd track number or an even track number has been read.

In this regard it is important to note that the read data channel may manifest a hysteresis characteristic in such a manner than one track number may be read, even though the head 102 is presently located mostly within an adjacent track. This preference to a particular head number stems from the fact that certain flux transitions denoting the one track number occur before the flux transitions denoting the adjacent track number. Once a bit position becomes set, it remains set and thereby misses the later occurring (and stronger) flux transition designating the track over which the head is mostly positioned. As will be explained hereinafter, a method is provided, based on relative A/B burst amplitudes, for overcoming this track number error based on hysteresis.

Returning to the discussion of FIG. 2B, an edge phase EB_B>A extends from the switch point 46 to the edge of the even track, and an edge phase OB_B>A extends from the edge of the even track to the low amplitude level equivalence point (A=BLo). An edge phase OB_A>B extends from a switch point 46 to the boundary between the odd and even tracks, and an edge phase EB_A>B extends from the track boundary to the high amplitude level equivalence point (A=BHi).

FIGS. 4A through 4G set forth an overall flowchart which illustrates a method for calculating an absolute position within the boundaries of each track to a resolution of a thirty second of a track pitch. In order to make the calculation of track pitch vernier, it is necessary to determine which phase (edge) is applicable, and then to obtain necessary amplitude measurements and prestored values in order to carry out the determination of the track pitch vernier.

Before discussing the details of the method, it should be observed that the method is preferably implemented within a control program executed by a drive microcontroller 140 of the disk drive 100. The microcontroller 140 preferably includes a sixteen bit microcontroller, such as type 78322 made by NEC Corporation, or equivalent. In this approach, the track number read from the track number field 24 is assigned to eleven most significant bits of the sixteen bit track position number. The five lower bits are provided as one of 32 possible positional increments per track as depicted in FIG. 3. When the track number is read from the track number field 24, the eleven bits are loaded into the eleven high bit positions of the sixteen bit position register, and the lower five bits are preloaded with a numerical value of 16, which corresponds to the nominal track centerline quantization value. All of the adjustments provided by the subroutines depicted in FIGS. 4B through 4G adjust the preloaded numerical value to a corrected value. The FIGS. 4A through 4G flowcharts are drawn in top-down format, meaning that the sequence progresses from top to bottom of each flowchart.

In order to remove the positional ambiguity which may stem from certain track numbers due to read channel threshold characteristics and resultant hysteresis and possible errors in the track number, a favor track number flag FVR_TK is set during the seek routine. Those skilled in the art will appreciate that the track number actually recovered from the read channel may not be the closest track to the head, due to read channel hysteresis characteristics. If, as is presently preferred, five or more tracks are being crossed between each servo sector interval sampled, the favor track flag FVR_TK is set to a one. This denotes a high speed portion of a seek operation at which the track numbers read from the track number fields 24 are used in lieu of some of the B burst edge information lying at the transition between adjacent track boundaries. If less than five tracks are being crossed between each servo sector interval sampled, the favor track flag FVR_TK is set to zero. This denotes a low speed head movement phase, as in settling, and in this phase, between-track servo burst edges are preferred to the track number for determining exact position of the head transducer 102. The routines to set and clear the favor track flag are contained within the servo interrupt service routine which is executed periodically by the microprocessor in synchronism with passage of the head 102 over each servo sector interval 10.

Figure 4A:
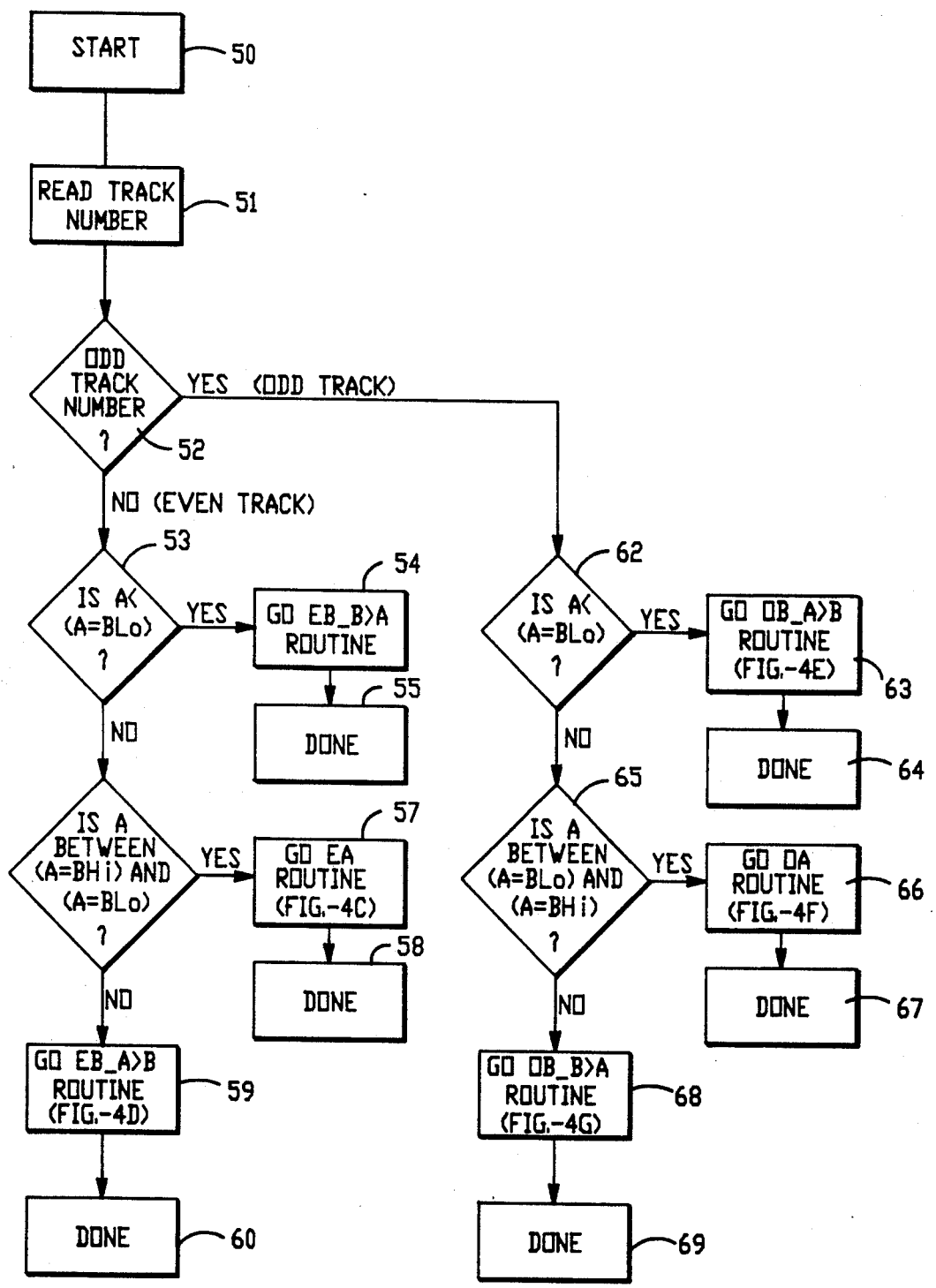
FIG. 4A is an overall, top-down control program flowchart for a portion of the microprocessor control program for determining absolute track position from a selected burst edge in accordance with the principles of the present invention.

Turning now to FIG. 4A, a start node 50 is entered at servo time by the microcontroller 140 on a servo interrupt service routine basis. The track number is read from the track number field 24 of the sector 10 and entered into a register at a step 51. A logical node 52 determines whether the track number identifies an odd track or an even track.

If an even track is identified by the track number, program flow progresses to a logical node 53 which tests whether the A burst amplitude is less than the low equivalence point (A=BLo). If so, an even track, B burst greater than A burst (EB_B>A) subroutine 54 (FIG. 4B) is called. In execution of this subroutine the B burst edge is the operative edge. This subroutine 54 is executed until done, as indicated at the done node 55. If the logical node 53 determines that A was not less than the low equivalence point (A=BLo), a logical node 56 tests whether A burst amplitude lies between the high equivalence point (A=BHi) and the low equivalence point (A=BLo). If so, an even track, A burst (EA) subroutine 57 (FIG. 4C) is called. This subroutine 57 uses an A burst edge and it is executed until a done node 58 is reached.

If A burst amplitude does not lie between the high and low equivalence points, as tested at the node 56, the only remaining possibility is that A burst amplitude is greater than the high equivalence point (A=BHi) and in this event an even track, A burst greater than B burst (EB_A>B) subroutine 59 (FIG. 4D) is called. This subroutine 59 employs a B burst edge. The subroutine 59 is executed until a done node 60 is reached.

Returning to the odd track/even track logical node 52, if an odd track is determined to be present, a logical node 62 tests whether A burst amplitude is less than the low equivalence point (A=BLo). If so, an odd track, A burst greater than B burst (OB_A>B) subroutine 63 (FIG. 4E) is called. This subroutine 63 employs a B burst edge and is executed until a done node 64 is reached. If not, a logical node 65 determines whether A burst amplitude lies between the high and low equivalence points. If so, an odd track, A burst edge (OA) subroutine 66 (FIG. 4F) is executed until a done node 67 is reached. The only remaining possibility is that A burst amplitude is greater than the high equivalence point (A=BHi). In this case an odd track, B burst greater than A burst (OB_B>A) subroutine 68 (FIG. 4G) is executed, using a B burst edge. This subroutine continues until a done node 69 is reached.

FIG. 4B sets forth the subroutine 54 for calculating the position vernier if the head 102 is located in the EB_B>A edge phase segment. A start node 200 begins this subroutine. The amplitude of the B burst edge is obtained at a step 201. At a step 202, the low equivalence value (A=BLo) is subtracted from the measured B amplitude to obtain a difference value DIFF. The difference value DIFF is multiplied by the slope value SLP at a step 203 and the resultant product equals a number NUM. A logical node 204 tests whether the number NUM is less than 8. If so, a logical node 205 then determines whether the favor track flag is set to one. If so, 15 is added to the actual track number (centered with a preset to 16) ACT_TK at a step 206 and execution then reaches a done node 207. If the favor track flag is zero, meaning that burst edge is favored over track number, the slope value NUM is subtracted from the actual track number ACT TK in a node 208 and a node 209 adds 23 to the resultant difference. A done node 209 is then reached.

If the logical node 204 determines that the number is not less than 8, a logical node 211 determines whether the, number NUM is greater than a value of 15. If so, a value of 8 is added to the actual track number ACT_TK at a step 212, and a done node 213 is then reached.

If the logical node 211 determines that the number NUM is not greater than 15, meaning that NUM lies in a range between 8 and 15, a step 21 subtracts the slope value NUM from the actual track number ACT_TK, a step 215 adds a value of 23 to the resultant sum to obtain the final position correction value, and a done node 216 is reached. This completes the discussion of the EB_B>A edge subroutine 54 depicted in FIG. 4B.

FIG. 4C sets forth the subroutine 57 for the EA edge phase subroutine 57. A start node 220 leads to a step 221 at which the low equivalence value (A-BLo) is subtracted from A burst amplitude in order to obtain a difference value DIFF. The difference value is then multiplied by the slope value SLP at a step 222 to achieve a number value NUM. A logical node 223 then tests whether the number value NUM is greater than a value of 15. If so, a value of 8 is then subtracted from the actual track number ACT_TK at a step 224, and a done node 225 is reached.

If the logical node 223 determines that the number NUM is less than 15, a step 226 subtracts the number NUM from the resultant difference at a step 227 to complete the determination of precise position; and, a done node 228 is then reached. The case of the number value NUM being less than zero should never occur, and no provision is therefore made to test for that possibility. This completes the discussion of the EA subroutine depicted in FIG. 4C.

Referring to FIG. 4D, the subroutine for the EB_A>B edge subroutine 59 begins at a start step 230 and leads to a step 231 at which the B burst edge amplitude is obtained The low equivalence point value (A+- BLo) is then subtracted from measured B amplitude to obtain a difference value DIFF at a step 232. The difference value DIFF is then multiplied by the slope value SLP at a step 233 to obtain a slope number value NUM. A logical node 234 then determines whether the number value NUM is less than 8.

If so, a logical node 235 tests whether the favor track flag FVR_TK is set. If so, a value of 16 is subtracted from the actual track number ACT_TK at a step 236 and a done node 237 is reached. If the favor track flag FVR_TK is not set, meaning that burst edge is preferred over track number, the numerical slope value NUM is added to the actual track number ACT_TK at a step 238, and a value of 24 is subtracted from the resultant sum at a step 239 to obtain actual track position. A done node 240 is then reached.

If the number value is not less than 8 as tested at the node 234, a second logical node 241 tests to see if the number value NUM is greater than 15. If so, a step 242 subtracts a value of 9 from the actual track number ACT_TK, and a done node 243 is reached. If not, the number value NUM is added to the actual track value ACT_TK at a step 244, and a value of 24 is subtracted from the resultant sum at a step 245. A done node 246 is then reached. This completes the discussion of the EB_A>B edge subroutine 59.

Referring to FIG. 4E, the OB_A>B edge subroutine 63 begins at a start node 250. B burst edge amplitude is obtained at a step 251, and the low equivalence value A=BLo is subtracted from B burst amplitude at a step 252 to obtain a difference value DIFF. The difference value DIFF is then multiplied by the slope value SLP at a step 253 to obtain a number value NUM. A logical node 254 then tests whether the difference is less than zero. If so, a value of 8 is added to the actual track number ACT_TK at a step 255, and a done node 256 is reached.

If not, meaning that the number value is greater than zero as tested at the node 254, a logical node 257 tests to see if the number value NUM is greater than 7. If so, a further logical node 258 determines if the favor track flag FVR_TK is set. If so, a step 259 adds a value of 15 to the actual track number ACT_TK, and a done node 260 is reached. If not, meaning that the burst edge is to be used in preference to the track number, the slope number value NUM is added to the actual track value at a step 261, and a value of 8 is added to the resultant sum at a step 262. A done node 263 is then reached.

If the number value NUM lies between zero and 7, as tested at the node 257, the number value NUM is added to the actual track number at a step 264, and a value of 8 is added to the resultant sum at a node 265. A done node 266 is then reached. This completes the discussion of the OB_A>B edge subroutine 63 depicted in FIG. 4E.

With reference to FIG. 4F, the OA edge subroutine 67 begins at a start node 270 and progresses to a node 271 at which the low equivalence value (A=BLo) is subtracted from A burst amplitude to yield a difference value DIFF. The difference value DIFF is then multiplied by the slope value SLP at a step 272 to yield a number value NUM. A logical node 273 tests whether the number value NUM is greater than 15. If so, a step 274 adds a value of 7 to the actual track number ACT_TK, and a done node 275 is then reached.

If the number value NUM is less than 15 as tested at the node 273, a step 276 adds the number value NUM to the actual track value ACT_TK and a value of 8 is subtracted from the resultant sum at a step 277. A done node 278 is then reached. The number value NUM should never be less than zero in this particular A burst edge phase subroutine 57. This completes the discussion of the OA edge subroutine depicted in FIG. 4F.

With reference to FIG. 4G the $OB_{13}$ B>A edge phase subroutine 68 begins at a start node 280 and progresses to a step 281 at which the B burst edge amplitude is obtained. Measured B burst edge amplitude is then subtracted from the low equivalence value (A=-BLo) to yield a difference value DIFF at a step 282. The difference value DIFF is then multiplied by the slope value SLP at a step 283 to produce a number value NUM. A logical node 284 tests whether the number value NUM is less than zero. If so, a step 285 subtracts a value of 9 from the actual track number ACT_TK, and a done node 286 is reached.

If the number value NUM is not less than zero, it is checked at a logical node 287 to see if it is above the value of 7. If so, a logical node 288 then checks to see if the favor track flag FVR TK is set. If so, a node 289 subtracts a value of 16 from the actual track number ACT_TK, and a done node 290 is reached. If the favor track flag is not set, meaning that burst amplitude is preferred over track number, a node 291 subtracts the numerical value NUM from the actual track number ACT_TK. A step 292 then subtracts a value of 9 from the resultant sum, and a done node 293 is reached.

If the numerical value NUM lies between zero and 7, as tested at the node 287, a step 294 subtracts the number value NUM from the actual track number ACT_TK, and a step 295 then subtracts a value of 9 from the resultant difference to produce the edge value for the particular track number. A done node 296 is then reached. This completes the discussion of the $OB_{13}$ B>A subroutine 68 depicted in FIG. 4G.

When the process depicted in FIG. 4A is completed, a complete 16 bit track location number is available to be subtracted by the microcontroller 140 from a destination track number in order to know the distance to the desired track location during the seeking operation. The desired track location 16 bit value is always set to include the centerline position thereof in the lower five bit positions.

With reference to FIG. 5, the drive 100 includes one or more commonly journalled disks 14 which are rotated at a predetermined angular velocity, such as 3600 rpm, by a spindle motor 13, such as a brushless DC spindle motor directly mounted to rotate the disk spindle and disks 12.

Each data surface has a respective data transducer head associated therewith. One disk surface 12 has the head 102 associated therewith, and an opposite major surface of the disk has the head 103 associated therewith, as shown in FIG. 5. The data transducer heads 102 and 103 are mounted to a head positioner structure 104, via a suitable load beam structure. For low power applications, the inverted flange load beam and loading tab arrangement described in commonly assigned, copending U.S. patent application Ser. No. 07,/491,748, filed on Mar. 12, 1990, now U.S. Pat. No. 5,027,241 is presently preferred, the disclosure thereof being expressly incorporated herein by reference at this portion of the specification.

The head positioner structure is preferably of an inline, mass balanced rotary actuator type, such as the actuator shown in the referenced '004 patent. An actuator rotary voice coil motor 106 translates electrical drive current into displacement force for positioning the heads 102 and 103 from track to track during track seeking operations and for maintaining the heads 102 and 103 over desired data track locations during track following operations.

Figure 6:
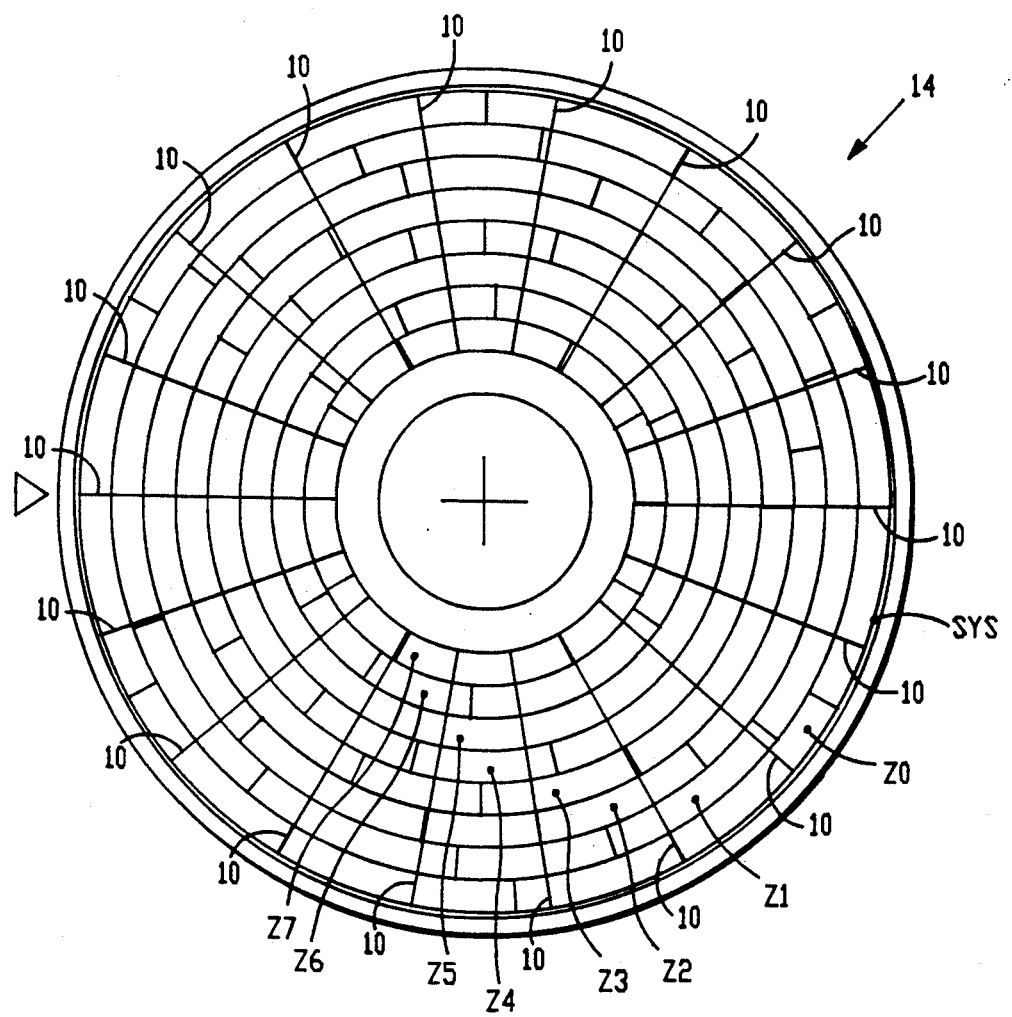
FIG. 6 is a plan view graph of a data surface of the FIG. 5 rotating storage disk, illustrating eight data sector zones Z0-Z7 having respectively different data transfer rates and commonly aligned servo sectors throughout the data storage space of the FIG. 5 disk drive.

All information recorded on the disk surface 12 is read by the transducer 102, including servo information in the servo sectors 10, and user data in user data sectors as shown in FIG. 6. A read channel preamplifier and write driver 106 preamplifies the minute electrical signals transduced from the recorded flux transitions during reading and amplifies the driving current for writing data to the disk surface during data writing operations. The circuit 106 also selects which head will be writing to the disk surfaces 12.

A monolithic data path electronics circuit 108 includes pulse detector circuitry 110 for detecting flux transitions and for converting the flux transitions into digital transitions, a peak detector circuit 112 for detecting peak amplitudes of the flux transitions read (so that the servo burst edge amplitudes may be obtained, for example), a phase locked loop 114 for separating flux transitions into digital data streams, and a frequency synthesizer 116. The pulse detector 110 includes AGC circuitry which is reset to the servo AGC level by reading the AGC servo field 16 with each incoming servo sector. This resets the read channel to the proper AGC level for servo burst amplitude after having been set to a data AGC value while data was being read from a data zone between the servo sector intervals 10. The frequency synthesizer 116 enables a number of different read and write frequencies to be established thereby to support data zones having differing data transfer rates and data sectors, as shown in FIG. 6. Preferably, the monolithic circuit 108 is implemented as a type DP8491 made by National Semiconductor Corp., or equivalent. This circuit operates on a single +5 volt power supply.

Another monolithic chip 120 includes a run length limited encoder/decoder 120 for encoding and decoding the data to and from 1,7 run length limited code. Preferably, the encoder/decoder 120 is in accordance with commonly assigned U.S. Pat. No. 4,675,652, the disclosure of which is incorporated by reference. The chip 120 also includes a data sequencer 124 and a buffer memory controller 126. The data sequencer 124 and buffer memory controller 126 together manage data conversion between serial by word format and parallel by byte format, actual storage and retrieval of user data blocks into and from predetermined storage locations within data sectors on the storage surfaces 12 and temporary storage of the user data blocks in a buffer memory 156. A microcontroller interface 128 enables the chip 120 to be controlled directly by the microcontroller 140.

A servo control circuit 130 is also included in the chip 120 and it provides AGC timing window values to control the AGC amplifier within the pulse detector 110, and it generates the appropriate timing signals to control the peak detector 112 in order to sample and hold the A burst and B burst amplitudes during seeking and settling mode, and optionally to sample and hold the C burst amplitude during track following mode. The control circuit 120 monitors the bit stream coming from the pulse detector 110 during a servo sector interval 10 and quickly synchronizes to the servo address mark 20 after the AGC field 16, so that the servo control circuit 130 may thereafter generate and put out control windows for separating the various servo fields 16, 18, 20, 22, 24, 28, 32 and 36 within the servo sector interval 10 following the address mark field 20. The servo control circuit 130 further generates a burst ready signal and puts it out over a line 133 to control burst amplitudes conversion by the A to D converter 142 of the microcontroller 140. It also generates and puts out an interrupt signal over a line 131 to interrupt program execution by the microcontroller during servo time.

The circuit 120 also includes a pulse width modulator 132 which puts out pulses of varying width or duty cycle to a servo loop low pass filter 134 which converts these control pulses into smoothed driving currents which are supplied to a servo driver circuit 136. The servo driver circuit 136 drives the rotary voice coil actuator motor 106. For example, a duty cycle of one half for a control pulse nominally establishes a zero driving current at the actuator motor 106. When the duty cycle exceeds one half, driving current in one direction is generated and put out. When the duty cycle is less than one half, driving current in the other direction is generated and put out. Thus, the one half duty cycle point marks the midpoint of the dynamic range of the pulse width modulator 132.

During track following operations of the drive 100, the A burst and C burst amplitudes are sequentially applied to multiplexed inputs of an analog to digital converter element 142 of the microcontroller 140. The microcontroller 140 sequentially converts the burst edge analog amplitude values into digital values. Alternatively, and less preferably , a pulse amplitude difference circuit (not shown) may be included to receive the A burst and C burst amplitudes and derive an analog position error/difference value for quantization by the microcontroller A to D 142. The A to D also receives the A burst edge amplitude and B burst edge amplitude values during track seeking and settling mode and converts those values into digital numbers, as explained above.

The microcontroller 140 also directly controls the spindle motor 13 through a spindle motor driver circuit 144. Disk speed is monitored by the microcontroller by timing the interval between each successive active index sector 22.

An EPROM 146 contains some of the program instructions which are executed by the microcontroller 140. Other access-time-sensitive instructions are contained within an on-board ROM within the microcontroller 140 itself. The EPROM 146 is addressed over a mid-order bus 147 directly from the microcontroller 140 supplying address values for address bit positions A8 through A12. Low order address bit positions A0 through A7, and high order address bit positions A13 through A15 are supplied to the micro interface 128 which demultiplexes them and supplies them over a bus 148 to the EPROM 146. High order address bit positions A13 through A15 are supplied over a bus 150 from the microcontroller 140 directly to the micro interface 128. A bus 149 provides memory, address, and data values to the micro interface 128 and also to a SCSI interface circuit 152.

A buffer data bus 154 connects the SCSI interface chip 152 to the RAM buffer memory array 156 and also to the buffer control circuit 126. Buffer memory addresses are generated by the buffer control circuit 126 and put out to the buffer memory array 156 over an address bus 158. A bus 160 provides an input/output path between the disk drive 10 and the host computing system (not shown). A termination 162 may be provided to provide suitable termination impedances to the bus lines 160 leading to the host computing equipment with which the drive 100 is operatively connected.

With reference to FIG. 6, a presently preferred data zone arrangement is depicted which improves the efficiency of bit packing on the data surface 12 of the disk 14. Other data zoning arrangements are clearly feasible. As is known, bit density is a function of relative velocity between the data transducer head 102 and the rotating disk surface 12. This relative velocity is the greatest at the radially outermost tracks, and is least at the radially innermost tracks. Each of the eight data zones Z0-Z7 contains e.g. 117 concentric data tracks.

An outermost region Sys of the data surface 12, e.g. comprising four data tracks, contains system information needed for operation of the disk drive subsystem 10. The outermost data zone Z0 includes 60 data sectors and has a raw data rate of 18.20 Mbps, a coded frequency of 27.29 MHz. This zone stores e.g. 7.13 megabytes on both sides of the disk 14.

The next zone Z1 contains 55 sectors, has a raw data rate of 16.76 Mbps, a coded frequency of 25.14 MHz, and stores 6.53 megabytes. The third data zone Z2 contains 52 sectors, has a raw data rate of 15.41 Mbps, a coded frequency of 23.11 MHz, and stores 6.17 megabytes on both sides of the disk 14. The fourth data zone Z3 has 46 sectors, has a raw data rate of 14.00 Mbps, a coded frequency of 21.00 MHz and stores 5.45 megabytes on both sides of the disk. The fifth data zone Z4 has 42 sectors, has a raw data rate of 12.80 Mbps, a coded frequency of 19.20 MHz, and stores 4.97 megabytes on both sides of the disk. The sixth data zone Z5 has 38 sectors, has a raw data rate 11.64 Mbps, a coded frequency of 17.45 MHz, and stores 4.49 megabytes on both sides of the disk. The seventh data zone Z6 has 33 sectors, has a raw data rate of 10.13, a coded frequency of 15.20 MHz, and stores 3.89 megabytes on both sides of the disk. The eighth data zone Z7 has 30 sectors, has a raw data rate of 9.24. Mbps, a coded frequency of 13.87 MHz and stores 3.53 megabytes on both sides of the disk 14. Several tracks inside of the eighth data zone having the characteristics of the inside zone Z7 are available for storage of system diagnostics and other values. The coded frequencies are synthesized by the frequency synthesizer 116 under the control of the microcontroller 140.

All told, with the data zone arrangement shown in FIG. 6, a total of 42.17 megabytes may be stored on both sides of a single disk 14. Preferably, the disk 14 has a 2.5" diameter. By adjusting the raw data frequency with the data zones, flux changes per inch can be held fairly constant, e.g. ranging from a high of 35,178 for Z0 to a low of 31,990 for Z6.

As is apparent from FIG. 6, the servo sector intervals 10 occur at a regular rate, asynchronously with the data sectors of the data zones except at the index (marked by a wedge at the edge of the disk 14 in FIG. 6). There are preferably 52 servo sectors 10. The servo frequency is fixed at 16 MHz, so as to be somewhat below the highest raw data rate.

Figure 7:
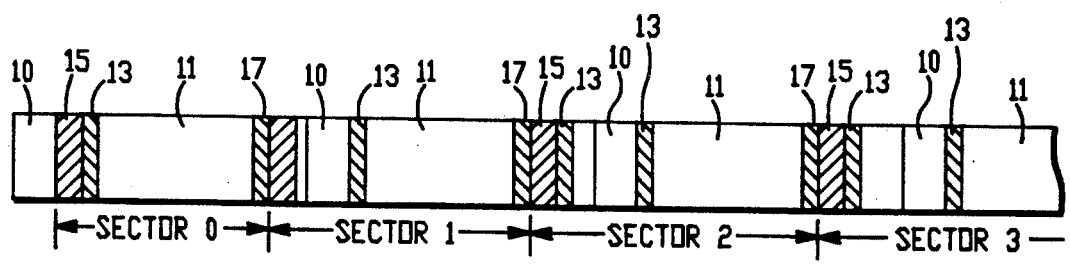
FIG. 7 is a diagram of a segment of a data track including data sectors and embedded servo sectors.

As shown in FIG. 7, each data sector 11 begins with a data sync field 13 which enables the timer circuit 130 and PLL 114 to resynch to the zone data rate. Since each embedded servo sector operates at a constant 3T data rate, a data sync field 13 follows each servo sector as well, so that the read channel circuitry may resynch to the data rate following each servo sector interruption. A data ID field 15 occurs at the beginning of each data sector and identifies the data sector to the 124. An ECC and tolerance gap 17 are also included at the end of each data sector 11.

The referenced '004 patent describes a track seeking servo loop in FIG. 17 thereof, and a track following servo loop in FIG. 18. These loop structures are examples of servo loops in which performance is enhanced by inclusion of absolute track position values during seeking and settling in accordance with the principles of the present invention.

The microfiche appendix to this patent specification contains two assembler language (source code) program listings, a first listing labelled "SERVO" and a second listing labelled "SEEK" which is a routine called from the SERVO routine.

To those skilled in the art many changes and modifications will be readily apparent from consideration of the foregoing description of a preferred embodiment without departure from the spirit of the present invention, the scope thereof being more particularly pointed out by the following claims. The descriptions herein and the disclosure hereof are presented by way of illustration only and should not be construed as limitations of the scope of the present invention.

What is claimed is:

1. A method for determining head position of a data transducer head relative to a selected one track of a multiplicity of concentric data tracks within a disk drive data storage device, the method including the steps of:

providing at least one prerecorded servo sector within the data track, the servo sector including first occurring servo burst means being prerecorded with a predetermined servo burst magnetic flux transition pattern and having one longitudinal burst edge located substantially congruent with a track centerline of the said track, and having another longitudinal burst edge located substantially congruent with a track centerline of a second track immediately adjacent to the said track, and second occurring servo burst means being prerecorded with the predetermined servo burst magnetic flux transition pattern for providing burst edges substantially congruent with track boundaries of the said track;

detecting the presence of the sector as it passes by the data transducer head, reading the first occurring servo burst means with the data transducer head to determine a peak amplitude value therefrom and recording a first burst peak amplitude value, comparing the first burst peak amplitude value with at least one predetermined reference burst amplitude value to establish whether the transducer head has passed along a linear portion of one of the said edges of the first occurring servo burst, and if so, determining from the recorded first burst peak amplitude the position of the data transducer head, and if not, reading the second occurring servo burst means with the data transducer head to determine a peak amplitude value therefrom and recording a second burst peak amplitude value, determining from the recorded second burst peak amplitude value the absolute position of the data transducer head relative to the said track.

2. The method for determining head position as set forth in claim 1 comprising the further step of determining during a calibration routine the reference burst amplitude value.

3. The method for determining head position as set forth in claim 2 wherein the step of determining the reference burst amplitude value comprises the step of determining at least one amplitude equivalence point at a location radially between the first servo burst means and the second servo burst means.

4. The method for determining head position as set forth in claim 3 wherein the step of determining at least one amplitude equivalence point comprises determining a high amplitude equivalence point and a low amplitude equivalence point.

5. The method for determining head position as set forth in claim 1 comprising the further step of determining during a calibration operation the slope of each said edge by determining radial positional displacement of the data transducer head as a function of burst amplitude, and wherein the step of determining the position of the data transducer head is carried out further in relation to the said slope.

6. The method for determining head position as set forth in claim 1 wherein the step of providing at least one servo sector within the data track further comprises the steps of providing a servo sector address mark field including a magnetic flux transition pattern prerecorded therein for identifying the start of a servo information pattern, providing a track number field including a magnetic flux transition pattern prerecorded therein for identifying the said one data track from among the multiplicity thereof; and, comprising the further steps of:

reading the servo sector address mark field with the data transducer head to determine the start of the said servo information pattern, and reading the track number field to identify the said one data track from among the multiplicity thereof.

7. The method for determining head position as set forth in claim 6 wherein the steps of providing a servo sector address mark field and a track number field are carried out prior to providing the first and second occurring servo burst means.

8. The method for determining head position as set forth in claim 6 wherein the determined head position is added to a value obtained from the track number field of the said track, thereby to provide a number indicative of the track number of the said track and the position of the data transducer head within the said track.

9. The method for determining head position as set forth in claim 8 wherein the track number of the said track is initially set to include a positional value indicative of track centerline position, and wherein the determined head position is added to or subtracted from the positional value of track centerline position, thereby to provide the position of the data transducer head within the track.

10. The method for determining head position set forth in claim 9 wherein the positional value is determined to be a value which is one half of the data transducer head position quantization resolution within the data track.

11. The method for determining head position set forth in claim 10 wherein the said quantization resolution within the data track is 32 increments, and wherein the positional value is 16.

12. The method for determining head position set forth in claim 6 wherein the step of reading the track number field at the vicinity of a track boundary between two adjacent ones of the said data tracks results in an ambiguity as to which data track is in closest proximity to the head, and comprising the further steps of:

determining the radial velocity of the head relative to the multiplicity of data tracks during a track seeking operation, comparing determined radial velocity with a predetermined reference velocity value, selecting a track number read by the data transducer head as an indicator of radial head position when the determined radial velocity is greater than the reference velocity value, performing the steps of reading the second occurring servo burst and determining from the recorded second burst peak amplitude the absolute position of the data transducer head, and correcting the track number read by the data transducer head by reference to the recorded second burst peak amplitude.

13. The method for determining head position set forth in claim 1 wherein a width of the selected one track is greater than the width of the data transducer head, and further wherein the data transducer head experiences a dead zone range of radial movement with respect to a said burst such that burst amplitude read by the data transducer head from the said burst remains substantially constant as the data transducer head moves radially through the said dead zone range.

14. The method for determining head position set forth in claim 1 wherein the steps of comparing the first burst peak amplitude with the predetermined reference burst amplitude value and reading the second occurring servo burst means are carried out, at least in part, concurrently.

15. A high performance disk drive having a head position servo loop for positioning a data transducer head of the drive relative to a rotating data storage disk of the drive having at least one data storage surface having recorded thereon a pattern of embedded servo sectors, the servo sector pattern being radially wider than the effective radial head gap width of the data transducer head, the pattern including for a second concentric data track lying between a first track and a third track of a multiplicity thereof; a sector servo address mark field including a magnetic flux transition pattern prerecorded therein for identifying the start of the servo sector pattern; a track number field including a magnetic flux transition pattern prerecorded therein for identifying the second data track from among the multiplicity thereof; a first occurring servo burst being prerecorded with a predetermined servo burst magnetic flux transition pattern and having one longitudinal burst edge located substantially congruent with a track centerline of the second track, and having another longitudinal burst edge located substantially congruent with a track centerline of a predetermined one of the first track and the third track, and second occurring servo bursts being prerecorded with the predetermined servo burst magnetic flux transition pattern for providing burst edges substantially congruent with track boundaries of the second track relative to the first track and the third track, the second servo bursts being recorded entirely within the boundaries of the first track and the third track and providing positional information via the head for use by the servo loop when positional information from the first servo burst is not available to the head as it passes over the pattern.

16. The disk drive set forth in claim 15 wherein the sector patter further comprises for a track following servo mode of the servo loop a third occurring servo burst being prerecorded with the predetermined servo burst magnetic flux transition pattern and located spatially the third occurring servo burst has one longitudinal burst edge located substantially congruent with the track centerline of the second track and another longitudinal burst edge located substantially congruent with a track centerline of another of the the first track and the third track, so that positional information read from the first and third servo bursts by the head provide track centerline location information to the servo loop during the track following servo.

17. The disk drive set forth in claim 15 wherein the data storage surface of the disk drive has a plurality of data zones of data tracks in which the data tracks thereof have predetermined data sector lengths and numbers and data transfer rates so as to render more optimal storage bit density and relative movement between the head and disk surface, each servo sector being radially aligned throughout the extent of the data zones, and each servo sector including a servo sync field preceding the servo address mark field for synchronizing a read channel means of the disk drive including the data transducer head to the data rate of servo information included in the servo sector, and each servo sector being followed by a data sync field for resynchronizing the read channel means to the data rate of a particular data zone over which the data transducer head is passing.

18. The disk drive set forth in claim 17 including a frequency-programmable frequency synthesizer means operating under control of a programmed microcontroller means for programmably generating a plurality of coded frequencies for enabling the plurality of the data zones to to be read from and written at a data transfer rate selected for each zone.

19. A method for determining a digital radial head position value within a disk drive including a rotating storage disk defining a data storage surface, a data transducer head for reading and writing data from and to concentric data storage tracks on the storage surface, control electronics associated with the data transducer head and an actuator for moving the head and wherein each data track includes embedded sector servo information including a prerecorded track number and portions of a plurality of types of servo bursts having longitudinal burst edges, the method comprising the steps of:

reading with the data transducer head the prerecorded track number from a track number field of a said embedded sector to determine radial head vicinity in relation to a said data track identified by the track number, determining the amplitude of a first type servo burst in the vicinity of the said data track identified by the track number, determining whether the amplitude indicates that the head is over a said burst edge thereof, and if so, selecting said burst edge by quantizing the amplitude read therefrom as a digital value, calculating a fine position vernier value relative to the said data track based upon the quantized digital value of selected burst edge amplitude, and adjusting the value of the track number by reference to the fine position vernier value thereby to provide the digital radial head position value for the said track and sector.

20. The method set forth in claim 19 wherein each of the plurality of servo bursts has a width greater than the width of a recording gap of the data transducer head, and wherein the data transducer head is radially positionable within a dead zone with respect to a said servo burst, the servo bursts being arranged so that longitudinal edges of the first type of said plurality of bursts are aligned with dead zones of a second type of said plurality of bursts, the method comprising the further steps of:

determining whether the amplitude of the first type servo burst indicates that the head is over a dead zone associated with the first type servo burst and thereupon switching to and determining the amplitude of the second type servo burst having an edge at least coextensive with the dead zone of the first type burst, and calculating the fine position vernier value relative to the said data track based upon the quantized value of the second type servo burst amplitude.

21. The method set forth in claim 20 comprising the further steps of determining the velocity of the data transducer head as the actuator moves the head over data tracks during a track seeking mode of operation of the disk drive, selecting the prerecorded track number read by the data transducer head as positional information when said velocity is over a predetermined value, and selecting the quantized value of the second type of servo burst amplitude as the fine position vernier value when it is otherwise selected and when said velocity is below the predetermined value.

22. The method set forth in claim 19 wherein the embedded sector servo information includes a repeating pattern prerecorded upon the data surface and including for a second concentric data track lying between a first track and a third track of a multiplicity thereof: a servo sector address mark field including a magnetic flux transition pattern prerecorded therein for identifying the start of the servo sector pattern; a track number field including a magnetic flux transition pattern prerecorded therein for identifying the second data track from among the multiplicity thereof; a first occurring servo burst being prerecorded with a predetermined servo burst magnetic flux transition pattern and having one longitudinal burst edge located substantially congruent with a track centerline of the second track, and having another longitudinal burst edge located substantially congruent with a track centerline of one of the first rack and the third track, and a second occurring servo burst being prerecorded with the predetermined servo burst magnetic flux transition pattern for providing burst edges substantially congruent with track boundaries of the second track relative to the first track and the third track the second servo bursts being recorded entirely outside of the first track and the third track.

23. The method set forth in claim 22 comprising the further step of performing a recalibration operation to determine a high amplitude equivalence value and a low amplitude equivalence value for the first and second servo bursts, and calculating a slope value for the edges of the first and second servo bursts.

24. The method set forth in claim 22 wherein the disk drive has a plurality of zones of data tracks in which the data tracks thereof have predetermined data sector lengths and numbers and data transfer rates so as to render more optimal storage bit density and relative movement between the head and disk surface, each servo sector being radially aligned throughout the extent of the data zones, and each servo sector including a servo sync field preceding the servo address mark field for synchronizing a master state machine means for controlling a read channel of the disk drive to the data rate of servo information included in the servo sector, and each servo sector being followed by a data sync field for resynchronizing the read channel to the data rate of a particular data zone over which the data transducer head is passing.

25. The method set forth in claim 24 wherein the disk drive eight zones of data tracks.

26. The method set forth in claim 19 comprising the further step of determining during a seeking operational mode the number of tracks crossed between successive samples of embedded sectors, and limiting the steps of quantizing burst edge amplitude and calculating a fine position vernier value to a track crossing rate below a predetermined value.

27. The method set forth in claim 26 wherein the predetermined value is a track crossing rate of five tracks per servo sample.

* * * * *